(12) United States Patent
Rungta

(10) Patent No.: US 6,484,186 B1
(45) Date of Patent: Nov. 19, 2002

(54) METHOD FOR BACKING UP CONSISTENT VERSIONS OF OPEN FILES

(75) Inventor: Vandana S. Rungta, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/504,237

(22) Filed: Feb. 15, 2000

(51) Int. Cl.$^7$ .......................... G06F 12/00; G06F 17/30
(52) U.S. Cl. ..................................................... 707/203
(58) Field of Search ....................... 707/1–10, 200–206; 714/6; 711/162

(56) References Cited

U.S. PATENT DOCUMENTS

| | | | |
|---|---|---|---|
| 5,175,849 A | * 12/1992 | Schneider | 707/202 |
| 5,403,639 A | * 4/1995 | Belsan | 707/204 |
| 5,435,004 A | * 7/1995 | Cox et al. | 707/205 |
| 5,819,292 A | * 10/1998 | Hitz et al. | 707/203 |
| 5,963,962 A | * 10/1999 | Hitz et al. | 707/201 |
| 6,289,356 B1 | * 9/2001 | Hitz et al. | 707/201 |
| 6,298,425 B1 | * 10/2001 | Whitaker et al. | 707/204 |
| 6,324,654 B1 | * 11/2001 | Wahl et al. | 707/204 |

OTHER PUBLICATIONS

Dave Hitz, James Lau and Michael Malcolm, "File System Design for NFS File Server Appliance," Jan. 19, 1994, pp. 1–23.

* cited by examiner

Primary Examiner—John Breene
Assistant Examiner—Linh Black
(74) Attorney, Agent, or Firm—Marger Johnson & McCollom, P.C.

(57) ABSTRACT

Whenever a file is opened for writing, a snapshot of the file is created. The snapshot includes a copy of the file's metadata. A snapshot file map is initialized, pointing nowhere. A bitmap of the blocks in the file map is initialized. As new data are written to a block in the file, the original contents of the block are copied to a duplicate block. The bitmap is updated to indicate that the contents of the block have changed. The snapshot file map is updated to point to the duplicate block, and the new data are written to the original block. To archive the file, the file system uses the bitmap to identify which blocks have changed since the file was opened. Unchanged blocks are read through the original file map, and changed blocks are read through the snapshot file map. Finally, when the file is closed and the archive operation is complete, the bitmap and the resources used by the snapshot are returned to the system.

19 Claims, 9 Drawing Sheets

METHOD FOR BACKING UP CONSISTENT VERSIONS OF OPEN FILES

FIELD OF THE INVENTION

This invention pertains to archiving computer files and more particularly to archiving computer files that are open for writing.

BACKGROUND OF THE INVENTION

In modern computer operations, many actions occur simultaneously. For example, a computer can be running several programs in memory at the same time, each using different data. This is especially true in a multi-user environment, where many users can be using the computer at the same time.

In such a multi-user environment, the computer is generally available for log-in at all times. The system cannot be closed to users while activities, such as back-up operations, are performed. The computer must be able to perform its administrative tasks without impacting users.

But when files are open for writing, the back-up operation can create a problem. With most types of files, the data in the file have an internal consistency that must be maintained. For example, if a file stores a letter, the contents convey a meaning. If the file is being written to change its meaning, the back-up operation should not begin until the write operation is complete. Otherwise, the archived file may include pieces from the different contents, and would lack consistency. On the other hand, the back-up operation cannot afford to wait until the file is completely written before archiving the file, as this could cause a potentially infinite delay in the archive operation (if users continue to open the same file before all other users have closed it).

Accordingly, a need remains for a method and apparatus that allows an archive operation to back up a consistent version of files even while the files are open for writing.

SUMMARY OF THE INVENTION

Whenever a file is opened for writing, a snapshot of the file is created. The snapshot includes a copy of the file's metadata. A bitmap and snapshot file map are initialized. When new data are to be written to blocks in the file, the original contents of the blocks are duplicated. The bitmap is updated to identify the changed blocks. The snapshot file map is updated to point to the duplicate blocks. The new data are then written to the original blocks. When the file is to be archived, the file system uses the bitmap to determine whether to access the blocks from the original or snapshot file map. Finally, when the file is closed and the archive operation is complete, the resources used by the snapshot are returned to the system.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
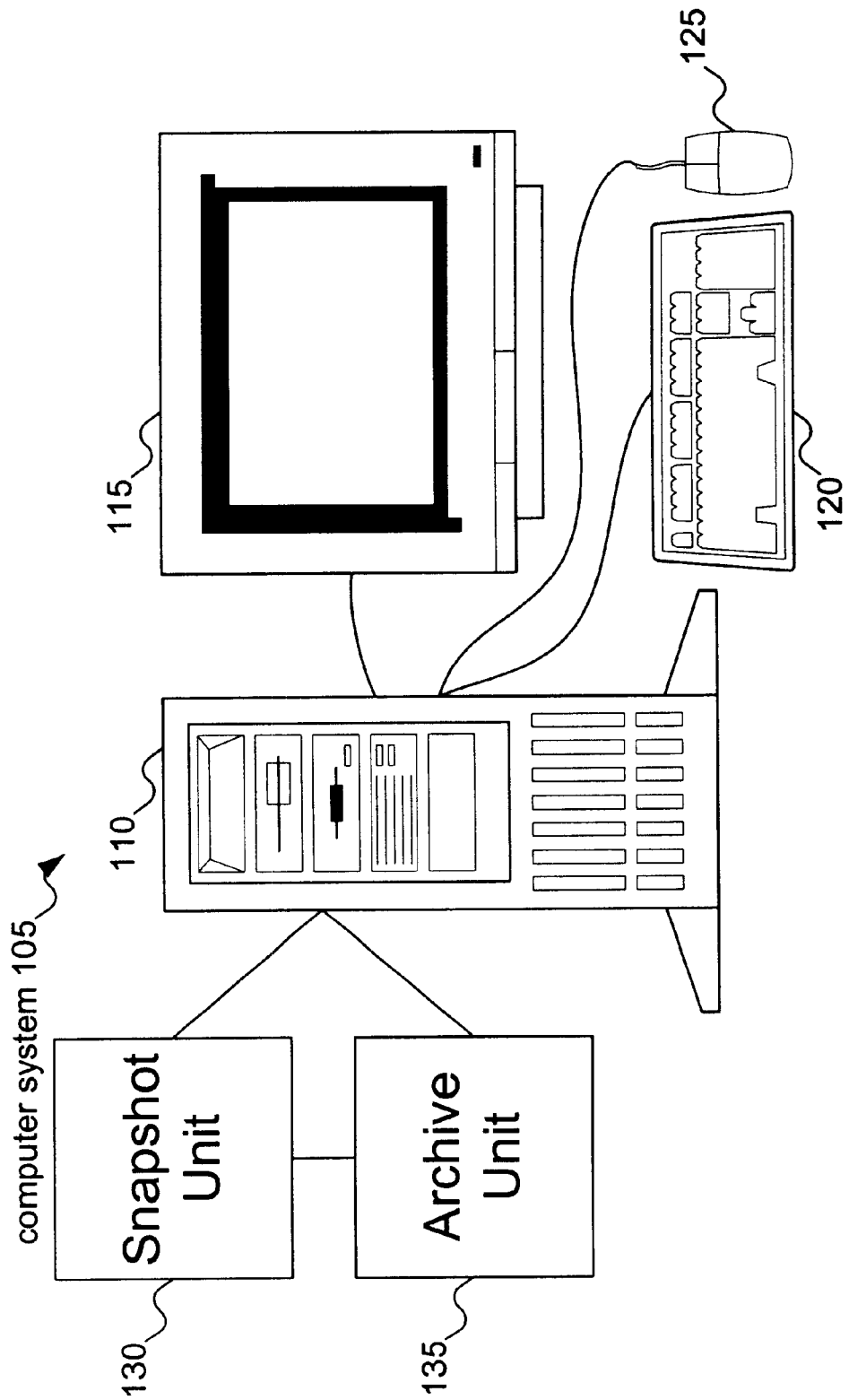
FIG. 1 shows a computer system on which the invention can be implemented.

FIG. 1 shows a computer system 105 on which a method and apparatus for using snapshots to archive consistent versions of open files can operate. Computer system 105 conventionally includes a computer 110, a monitor 115, a keyboard 120, and a mouse 125. Optional equipment not shown in FIG. 1 can include a printer and other input/output devices. Also not shown in FIG. 1 are the internal components of computer system 105: e.g., a central processing unit, memory, file system, etc. Computer system 105 can also be connected to a network (not shown).

Computer system 105 further includes a snapshot unit 130 and an archive unit 135 according to a preferred embodiment of the invention. Snapshot unit 130 is responsible for creating snapshots of files as the files are opened for writing. Archive unit 135 (which can also be called "back-up unit" or "back-up tool") is used to archive files stored on computer system 105. Archive unit 135 uses (indirectly) the snapshots created by snapshot unit 130 to archive consistent versions of open files. Archive unit 135 can archive files to an attached archive mechanism (not shown), or can archive files over a network to which computer system 105 is attached, e.g., to a server.

Figure 2:
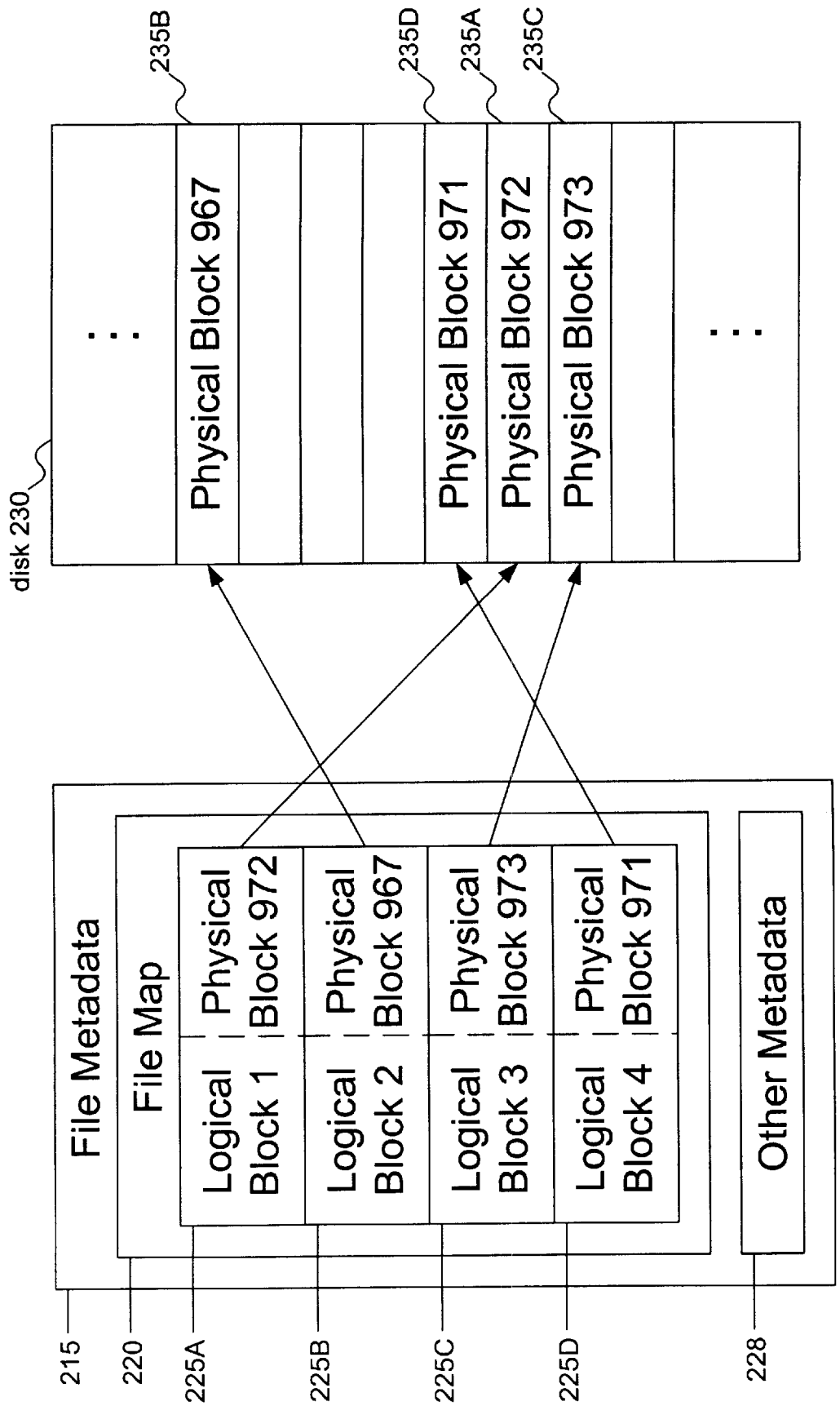
FIG. 2 shows a representation of a file and the blocks containing the data of the file.

FIG. 2 illustrates the structure of a file. The file includes metadata 215 (data about the file). Metadata 215 specifically includes a file map 220 that maps the logical order of the blocks comprising the file to the physical blocks stored on disk 230. In FIG. 2, file map 220 includes logical blocks 225A–D, which map to physical blocks 235A–D. Physical block 972 (235A) is the first logical block (logical block 1 (225A)), physical block 967 (235B) is the second logical block (logical block 2 (225B)), etc. (To distinguish the physical block numbers from the figure reference numbers, here and elsewhere the figure reference numbers for logical blocks 225A–D and physical blocks 235A–D are parenthesized.) Metadata 215 also includes other metadata 228, such as the last time the file was accessed, the size of the file, and hard links to the file.

In the preferred embodiment, the data of the file is stored as four-kilobyte blocks that can be stored anywhere on disk 230 on computer system 105. However, a person skilled in the art will recognize that the blocks can be of other sizes. Although FIG. 2 shows four logical blocks 225A–D and four physical blocks 235A–D, a person skilled in the art will also recognize that the number of blocks can vary (although the number of logical and physical blocks are the same). FIG. 2 also shows that physical blocks 235A–D do not have to be stored in any particular order, nor do they have to be contiguous.

Figure 3:
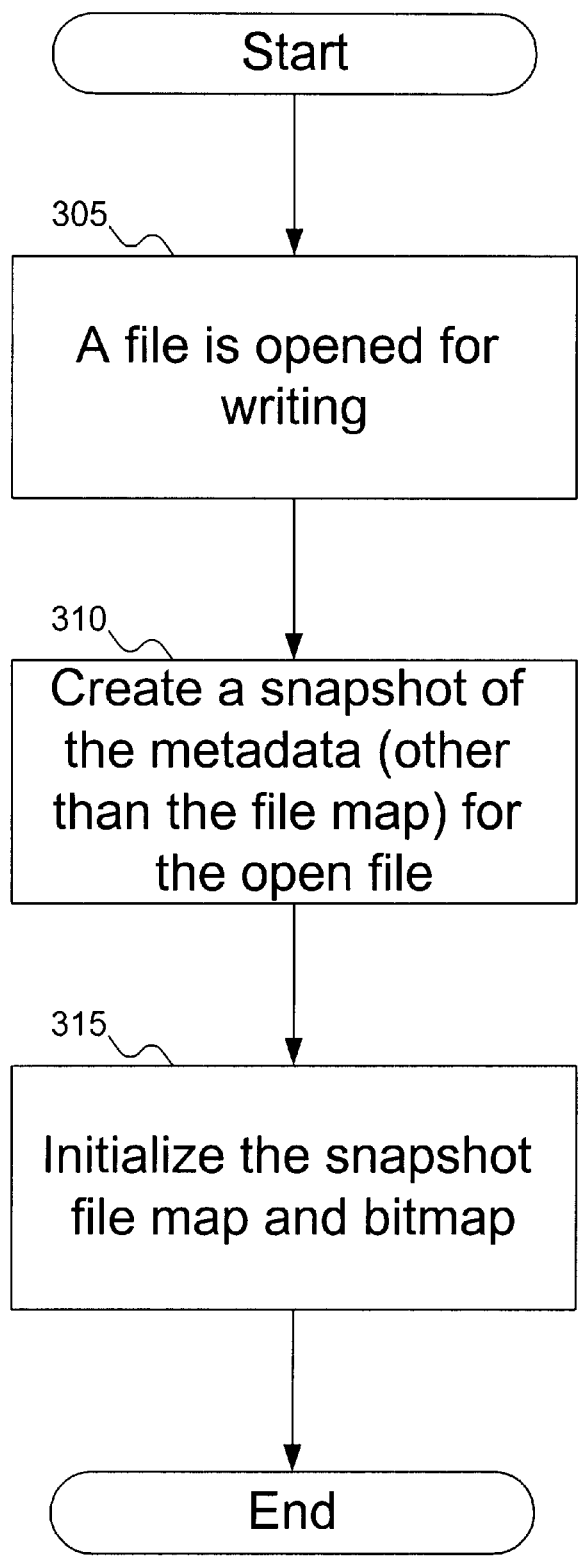
FIG. 3 shows a flowchart of how a snapshot is created according to a preferred embodiment of the invention.

FIG. 3 is a flowchart of how a snapshot is created. A snapshot is created when a file is opened for writing (step 305). Snapshots do not need to be created when files are opened for reading, as reading a file will not affect its consistency. When a file is opened for writing, the system copies the metadata (other than the file map) of the file into a snapshot (step 310). A file map for the snapshot is initialized so that it contains the same number of logical blocks as the original file map, but the logical blocks do not map to existing physical blocks. Also, a bitmap is initialized to indicate that all physical blocks pointed to by the original file map are still unchanged (step 315). A person skilled in the art will recognize that other metadata can also be included in the snapshot.

Since snapshots are created as files are opened for writing, only one snapshot exists for a file, regardless of the number of times the file is simultaneously open for writing. Only one snapshot is necessary, as it allows the archive unit to archive the most recent consistent version of the file.

Figure 4:
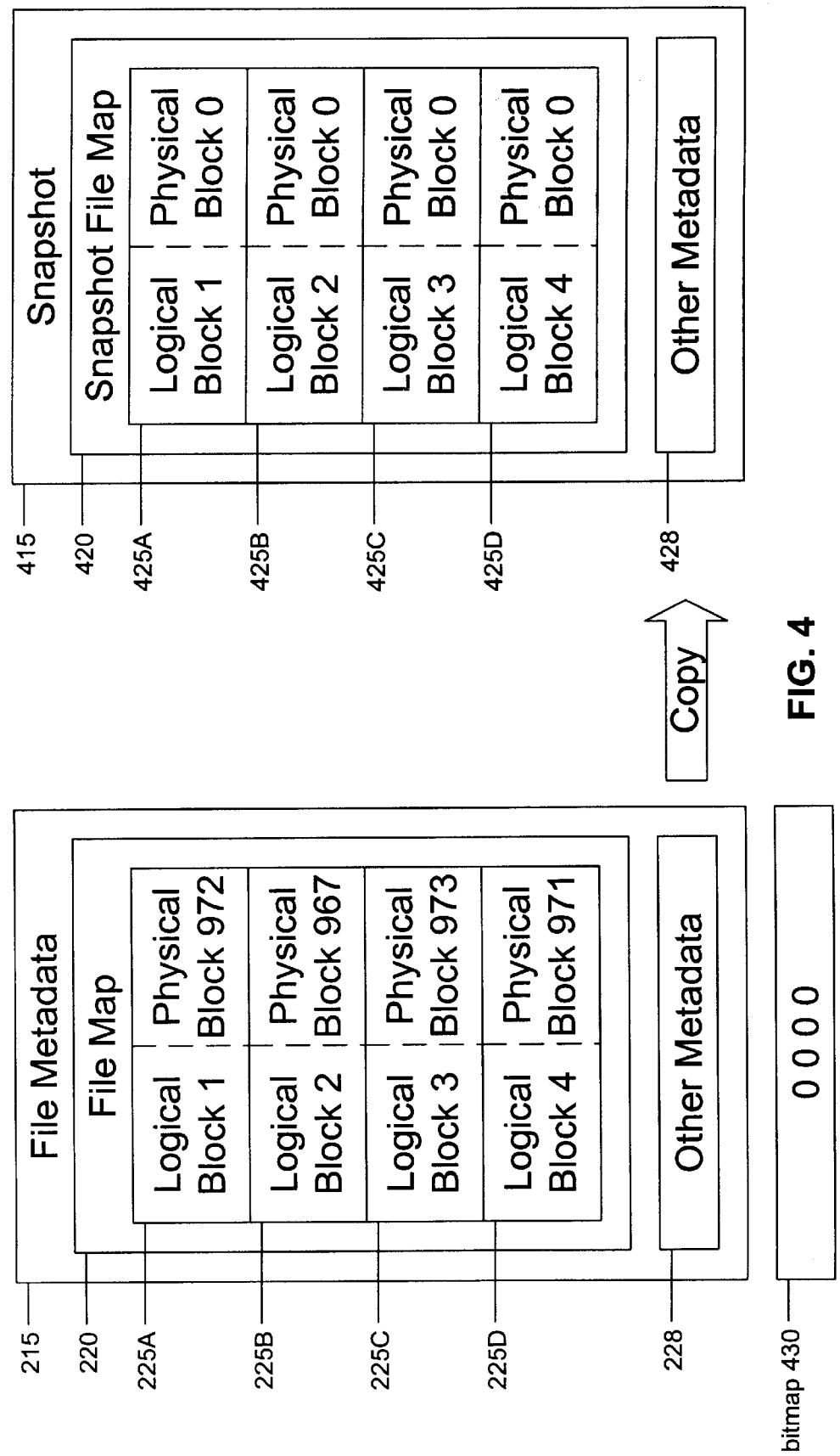
FIG. 4 shows how the data in the file of FIG. 2 is copied into the snapshot according to the preferred embodiment.

FIG. 4 shows the data copied into a snapshot 415. As mentioned above, snapshot 415 copies the metadata 215 of the file that has been opened for writing. The snapshot file map 420 is initialized with the same number of logical blocks as exist in the file map 220, but the logical blocks of the snapshot file map 420 do not point to any blocks on the disk. The other metadata 228 of the file is copied into the snapshot metadata 428. After metadata 228 has been copied to snapshot metadata 428, metadata 228 can change, while snapshot metadata 428 retains a copy of the original metadata of the file. Finally, bitmap 430 is initialized. When a bit of bitmap 430 is set, it indicates that the contents of the corresponding logical block have changed from the last consistent version of the file. The original contents can be found by accessing the corresponding logical block from snapshot file map 420.

FIG. 4 shows bitmap 430 as having four single-bit values. These four bits correspond to the four blocks of the file. However, a person skilled in the art will recognize that the number of bits in the bitmap can vary from four, and will be the same as the number of the blocks in the file.

Figure 5A:
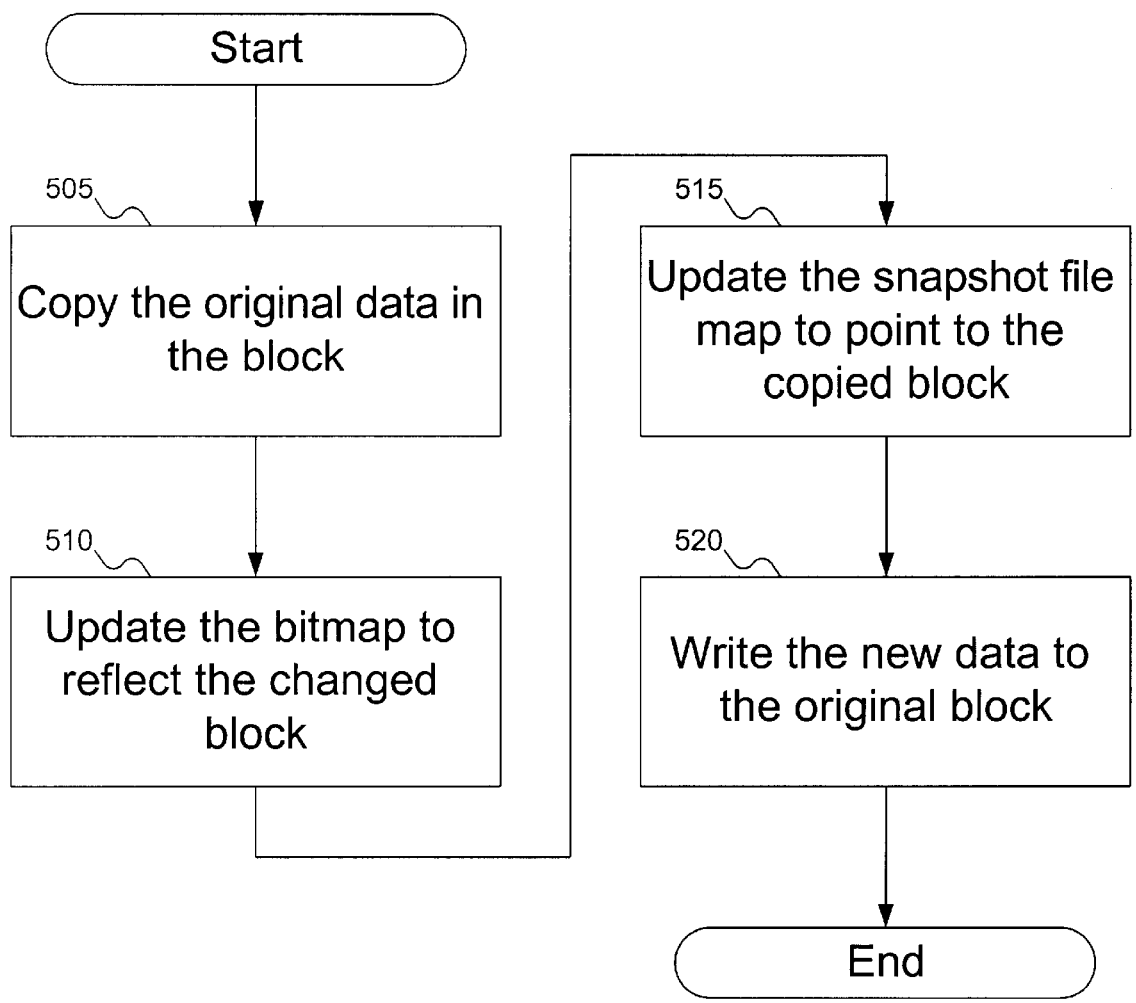
FIG. 5A shows a flowchart of the method for updating the snapshot as blocks of data are written according to the preferred embodiment.

FIG. 5A is a flowchart of the method for updating the snapshot as blocks of data are written to the file. At step 505, the physical block that is being updated is duplicated. At step 510, the bitmap is updated to reflect the fact that the physical block pointed to by the original file map has been updated. At step 515, the snapshot is updated so that the snapshot file map points to the duplicate physical block. Finally, at step 520, the new data are written to the original physical block.

Figure 5B:
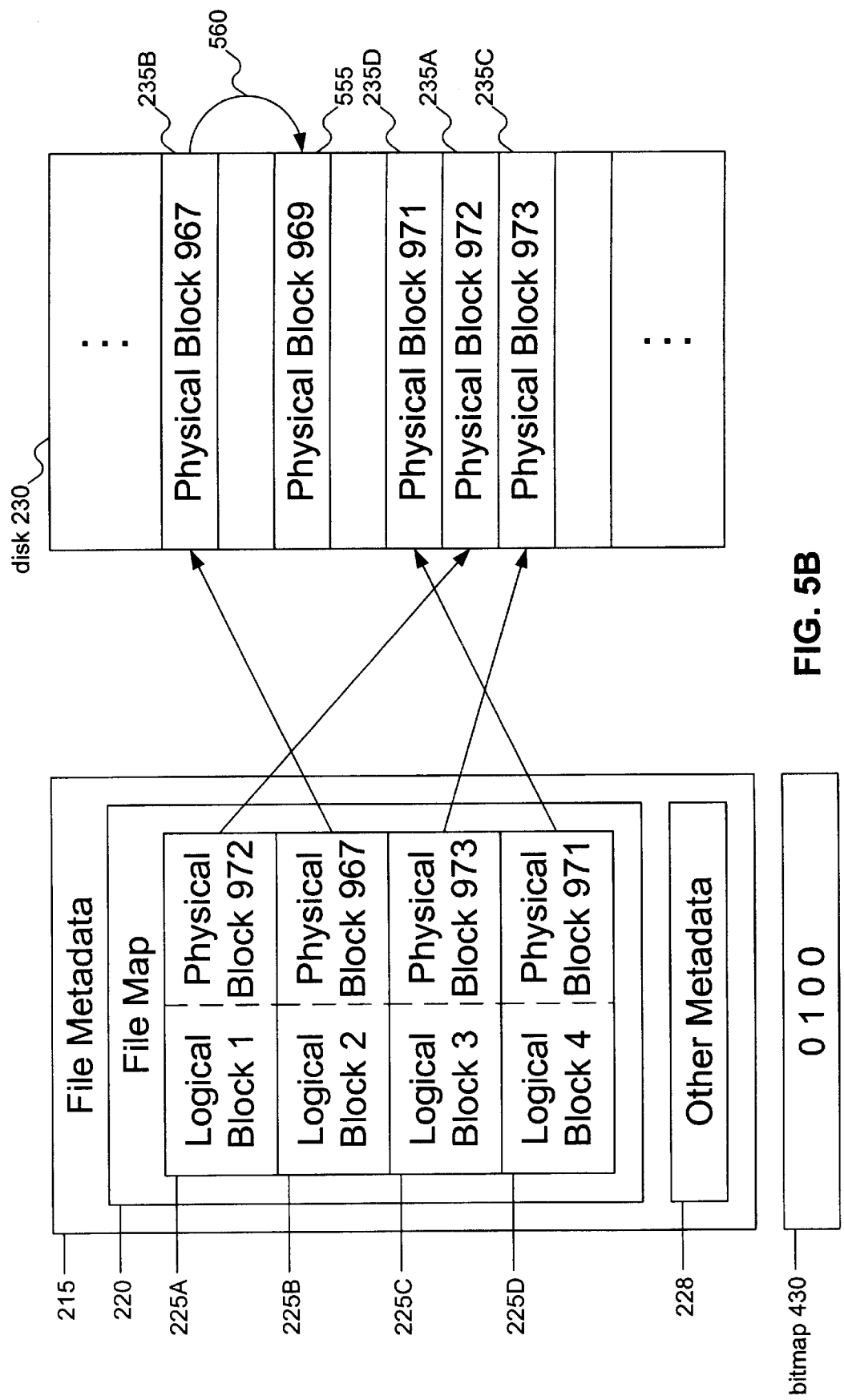
FIGS. 5B and 5C show a bitmap and snapshot file map updated to reflect a changed block of data in the file according to the method of FIG. 5A.
Figure 5C:
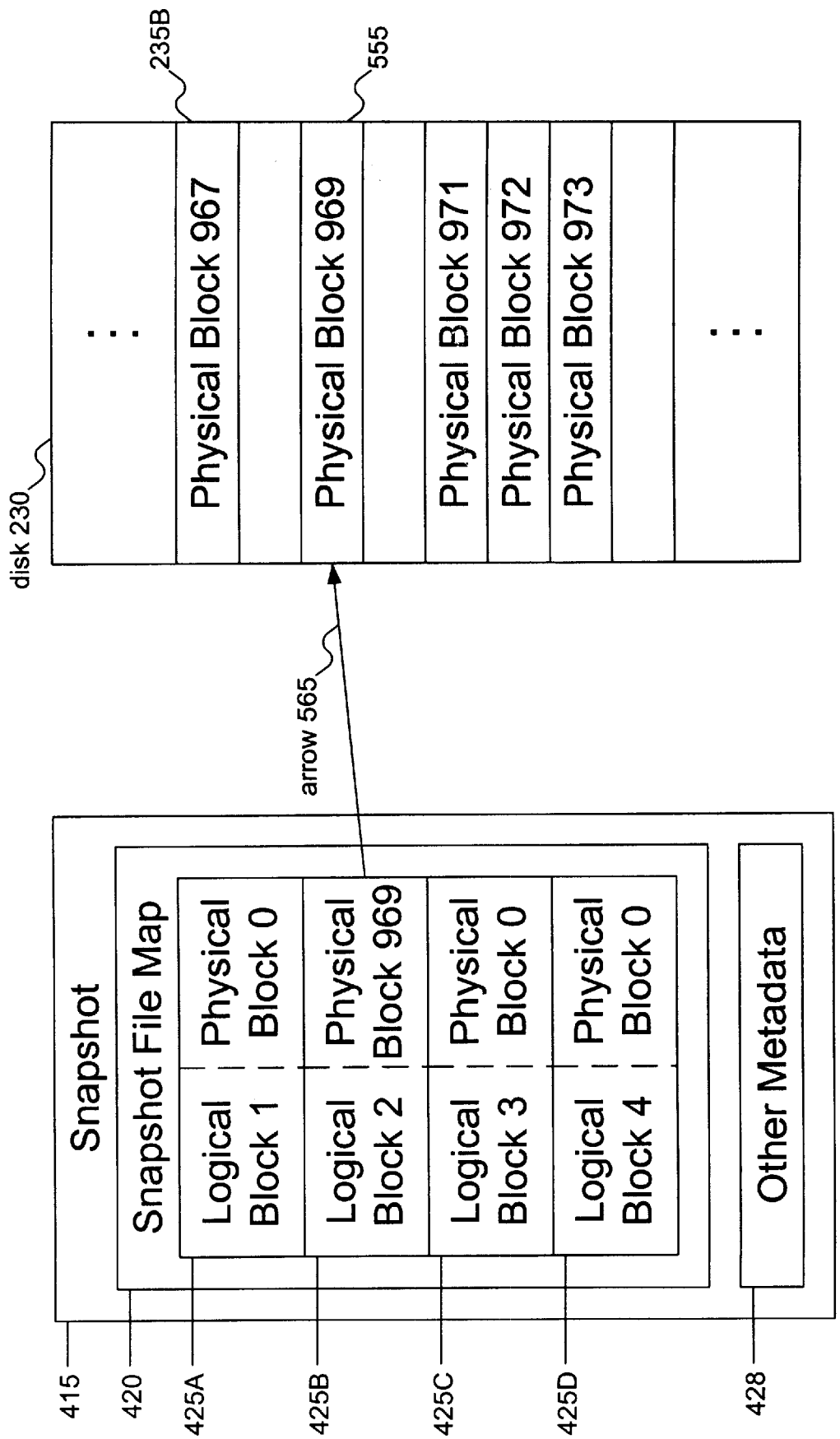

FIGS. 5B and 5C shows how a snapshot is updated to reflect a changed block of data in the file. Reference numbers for objects discussed in previous figures but not used in the structures of FIGS. 5B and 5C are omitted for brevity. In FIGS. 5B and 5C, it is assumed that the second block of data in the file, that is, logical block 2 (225B)/physical block 967 (235B), is being updated (i.e., opened for writing). However, a person skilled in the art will recognize that any block in the file can be changed using this procedure. Referring first to FIG. 5B, physical block 967 (235B) is copied to duplicate physical block 969 (555) (indicated by arrow 560). Duplicate physical block 969 (555) can be anywhere on disk 230. Bitmap 430 is then updated to indicate that logical block 2 (225B) has been updated by setting the bit corresponding to logical block 2 (225B). Referring now to FIG. 5C, logical block 2 (425B) of snapshot file map 420 of snapshot 415 is updated to point to duplicate physical block 969 (555), as indicated by arrow 565. Note that in FIG. 5B logical block 2 (225B) of file map 220 of the file metadata 215 still points to physical block 967 (235B), whose contents can now be updated.

Figure 6:
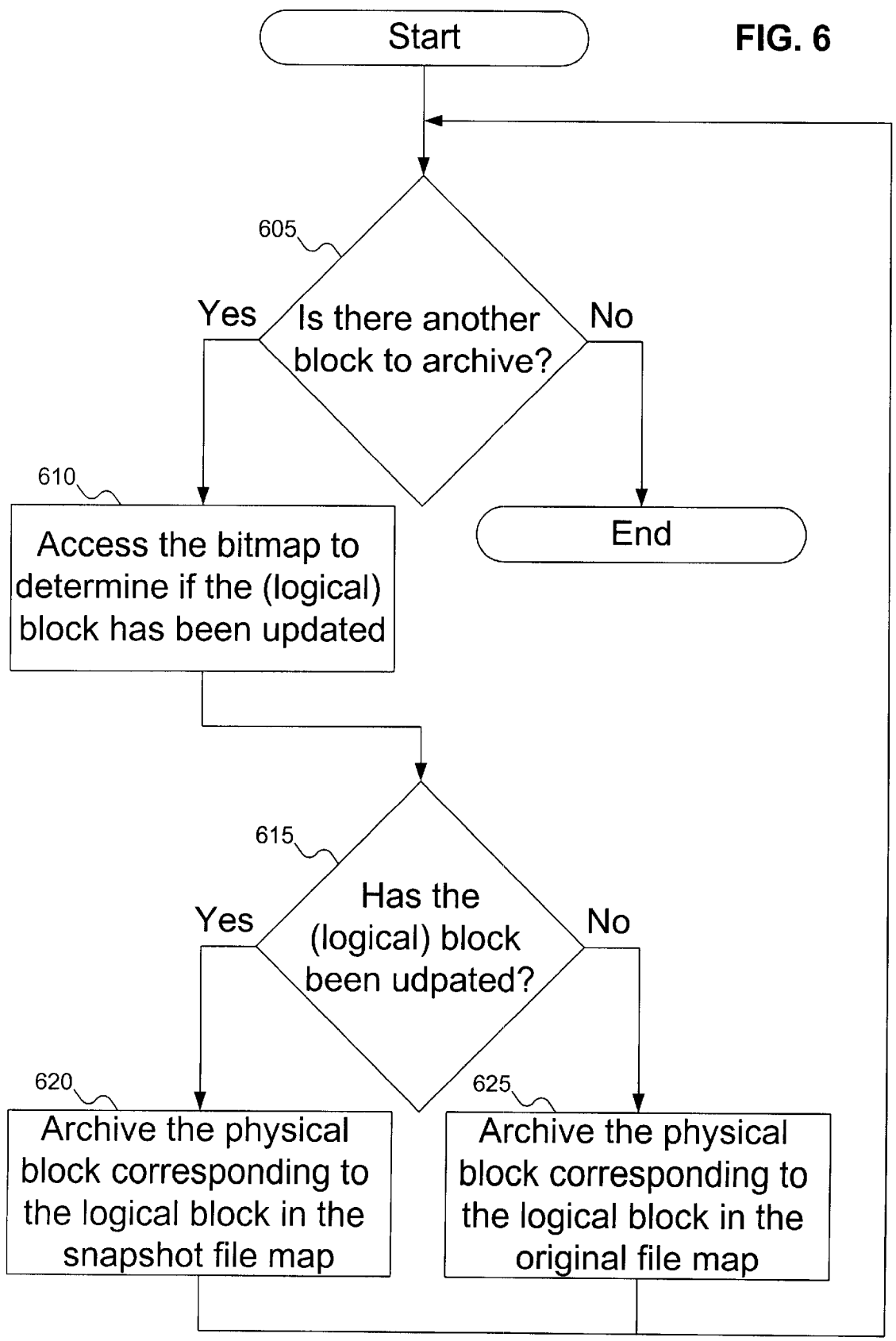
FIG. 6 shows a flowchart of the method for using the snapshot to archive files according to the preferred embodiment.

FIG. 6 is a flowchart of the method for using the snapshot 415 to archive files. The procedure of FIG. 6 assumes that a snapshot of the file exists; if no snapshot exists, then the file is not open for writing and is currently in a consistent state. At step 605, when the archive unit requests the next block in the file, the file system checks to see if the file has another block. If the file has been completely read, then the file has been completely archived. Otherwise, at step 610, the file system accesses the bitmap and checks to see if the next block has been updated. If at step 615 the next block has been updated, then at step 620 the file system uses the snapshot file map to find the physical block corresponding to the next logical block. Otherwise, at step 625 the file system uses the original file map to access the physical block corresponding to the next logical block.

It may happen that while the archive operation proceeds, the file being archived is closed. In that case, snapshot 415 is retained until the archive operation is finished with the file. This constraint insures that a consistent version of the file is archived, even if the consistent version is not the most recent (which would require the archive operation to stop mid-stream, erase the current contents of the file, and begin archiving the file anew).

FIGS. 5B and 5C show how the snapshot and bitmap can be used to archive the file. When the archive tool requests the first, third, or fourth blocks of the file, because the corresponding bits of bitmap 430 are not set, the file system accesses the original file map 220 and reads physical blocks 972 (235A), 973 (235C), and 971 (235D) for the archive tool. But when the archive tool wants to read the second block of the file, because the second bit in bitmap 430 is set, the file system accesses the snapshot file map 420 and reads physical block 969 (555) instead of physical block 967 (235B) for the archive tool. The archive tool also archives the metadata for the file. The file system reads the snapshot metadata 428 for the archive tool, as snapshot metadata 428 is the metadata of the file when the file was last in a consistent state.

The above discussion illustrates that the creation and use of the snapshot is performed completely transparently to the user, the program accessing the file, and the archive tool. The creation and update of the snapshot file as described in FIGS. 3, 4, and 5A–5C is done by the file system transparently to the user and the program writing to the file. And the use of the snapshot file for archiving as described in FIG. 6 is transparent to the archive program. Once the archive tool identifies itself as an archive tool to the file system, the file system uses the snapshot to present the archive tool with a consistent version of the file.

Figure 7:
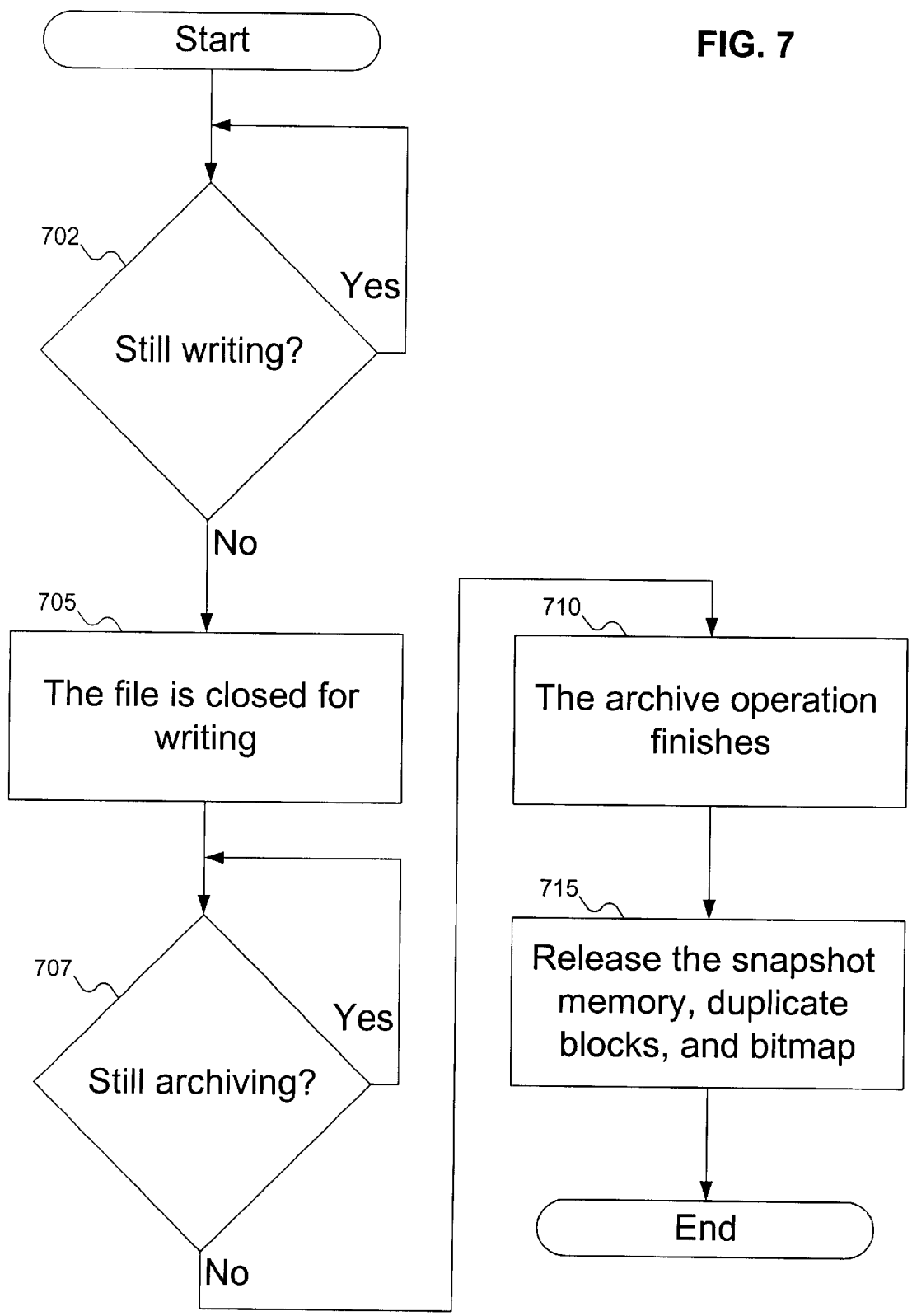
FIG. 7 shows a flowchart of the method for releasing resources used by the snapshot when a modified file is closed.

FIG. 7 shows a flowchart of the method for releasing resources used by the snapshot. First, the file system checks to see if any programs are still writing to the file (step 702). If the file is still open for writing, the snapshot is retained, as the file may not currently be consistent. Otherwise, the file system closes the file (step 705). Second, the file system checks to see if the archive operation is complete (step 707). If the file is being archived, the archive unit needs to continue using the snapshot, else as discussed above the archived version of the file might not be consistent. Once the archive operation is complete (step 710), the bitmap and all resources used by the snapshot are released (step 715). This release includes the duplicate metadata and all duplicated physical blocks.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

I claim:

1. A method for backing up a consistent version of an open file on a computer system, wherein the open file includes one or more blocks of data and metadata on a disk, and the metadata includes a file map specifying an order for the blocks of data, the method comprising:

creating a snapshot of the open file on the disk;

archiving the open file according to the snapshot; and releasing the snapshot of the open file.

2. A method according to claim 1 wherein creating a snapshot includes duplicating in memory the metadata of the open file.

3. A method according to claim 2 wherein duplicating in memory the metadata of the open file includes initializing a blank duplicate file map.

4. A method according to claim 2 wherein duplicating in memory the metadata of the open file includes initializing a bitmap to identify blocks that have changed since the open file was opened.

5. A method according to claim 1 wherein creating a snapshot includes updating the file map of the open file as new data are written to a first block of the open file.

6. A method according to claim 5 wherein updating the file map includes:

updating a bitmap to identify the first block as having changed;

copying the first block of the open file to a duplicate first block before new data are written to the first block of the open file;

updating a file map of the snapshot to point to the duplicate first block; and writing the new data to the first block of the open file.

7. A method according to claim 1 wherein creating a snapshot includes creating the snapshot of the open file as the file is opened.

8. A method according to claim 1 wherein archiving the open file includes:

accessing a bitmap to determine if any block has changed;

reading the unchanged blocks pointed to by the file map;

reading the changed blocks pointed to by a file map in the snapshot; and archiving the blocks in the order indicated by the file map.

9. A method according to claim 1 wherein releasing the snapshot includes releasing a bitmap and any memory and blocks used by the snapshot.

10. A computer-readable medium storing a computer program for backing up a consistent version of an open file on a computer system, wherein the open file includes one or more blocks of data and metadata on a disk, and the metadata includes a file map specifying an order for the blocks of data, the program comprising:

snapshot-creation software to create a snapshot of the open file on the disk;

archiving software to archive the open file according to the snapshot; and release software to release the snapshot of the open file.

11. A computer-readable medium storing a computer program according to claim 10 wherein the snapshot-creation software to create a snapshot includes metadata-duplication software to duplicate in memory the metadata of the open file.

12. A computer-readable medium storing a computer program according to claim 10 wherein the snapshot-creation software to create a snapshot includes file map-updating software to update the file map of the open file as new data are written to a first block of the open file.

13. A computer-readable medium storing a computer program according to claim 12 wherein the file map-updating software to update the file map includes:

bitmap-updating software to update a bitmap to identify the first block as having changed;

block-copying software to copy the first block of the open file to a duplicate first block before new data are written to the first block of the open file;

file map-updating software to update a file map of the snapshot to point to the duplicated first block; and block-writing software to write the new data to the first block of the open file.

14. A computer-readable medium storing a computer program according to claim 10 wherein the archiving software includes:

bitmap-access software to access a bitmap to determine if any block has changed;

first reading software to read the unchanged blocks pointed to by the file map;

second reading software to read the changed blocks pointed to by a file map in the snapshot; and archiving software to archive the blocks in the order indicated by the file map using an archive tool.

15. A system for backing up a consistent version of an open file on a computer system, the system comprising:

a computer, the computer including a file storage;

a file, the file including one or more blocks of data stored in the file storage of the computer and a file map specifying a logical order of the blocks of data comprising the file; and a snapshot, the snapshot including a snapshot file map locating copies of blocks of data comprising the file before the blocks of data were changed.

16. A system according to claim 15, the system further comprising a bitmap identifying which blocks of data comprising the file have changed since the file was last in a consistent state.

17. A system according to claim 16, the system further comprising an archive tool archiving the file according to the snapshot and the bitmap.

18. A system according to claim 15, the system further comprising the copies of blocks of data before the blocks of data were changed.

19. A system according to claim 15 wherein:

the file further includes metadata about the file; and the snapshot further includes snapshot metadata copying the metadata of the file when the file was last in a consistent state.

* * * * *